United States Patent [19]

Shimada et al.

[11] Patent Number: 5,209,888
[45] Date of Patent: May 11, 1993

[54] METHOD FOR PRODUCING FRP SCREW-LIKE FASTENING ELEMENTS

[75] Inventors: Shusaku Shimada; Kazuhiro Saito, both of Fukui, Japan

[73] Assignee: Fukuvi Chemical Industry Co., Ltd., Fukui, Japan

[21] Appl. No.: 391,473

[22] Filed: Aug. 9, 1989

[30] Foreign Application Priority Data

| Dec. 16, 1988 | [JP] | Japan | 63-318219 |
| Dec. 16, 1988 | [JP] | Japan | 63-318220 |
| Dec. 16, 1988 | [JP] | Japan | 63-318221 |
| Apr. 27, 1989 | [JP] | Japan | 1-108698 |

[51] Int. Cl.$^5$ ............................................. B28B 7/20
[52] U.S. Cl. ............................... 264/250; 264/257; 264/318
[58] Field of Search .............. 264/257, 258, 250, 318; 411/908

[56] References Cited

U.S. PATENT DOCUMENTS

| 2,949,054 | 8/1960 | White | 264/137 |
| 3,054,145 | 9/1962 | Helpa | 264/318 |
| 3,495,494 | 2/1970 | Scott | 264/257 |
| 3,859,409 | 1/1975 | Coonrod | 264/137 |
| 4,088,525 | 5/1978 | Gowetski et al. | 264/257 |
| 4,288,189 | 9/1981 | Ziaylek, Jr. | 264/278 |
| 4,657,458 | 4/1987 | Woller et al. | 411/182 |
| 4,687,394 | 8/1987 | Berecz | 411/361 |
| 4,687,395 | 8/1987 | Berecz et al. | 411/361 |
| 4,687,397 | 8/1987 | Berecz | 411/361 |
| 4,687,398 | 8/1987 | Berecz | 411/361 |
| 4,718,801 | 1/1988 | Berecz | 411/901 |
| 4,778,637 | 10/1988 | Adams et al. | 264/136 |

FOREIGN PATENT DOCUMENTS

| 0254481 | 1/1988 | European Pat. Off. . |
| 0268957 | 6/1988 | European Pat. Off. . |
| 1084088 | 6/1960 | Fed. Rep. of Germany . |
| 3839835 | 6/1989 | Fed. Rep. of Germany | 264/318 |
| 62-49171 | 10/1987 | Japan . |
| 62-49172 | 10/1987 | Japan . |
| 63-50388 | 3/1988 | Japan . |
| 63-72517 | 4/1988 | Japan | 264/257 |
| 63-224930 | 9/1988 | Japan | 264/257 |
| 8503300 | 11/1985 | Netherlands . |
| 1226265 | 3/1971 | United Kingdom . |

*Primary Examiner*—Jay H. Woo
*Assistant Examiner*—Robert B. Davis
*Attorney, Agent, or Firm*—Scully, Scott, Murphy & Presser

[57] ABSTRACT

A method for producing fiber-reinforced plastic screw-like fastening element including a thread portion and a head having a cross section which is larger than that of the thread portion. The method includes preparing a rod material including an elongated matrix formed of a plastic material and a plurality of elongated parallel fiber elements embedded within the matrix material along the length of the matrix, with the fiber elements having melting points substantially higher than the softening point of the matrix. Thereafter the prepared rod material of the screw is placed into a mold chamber having an internal surface of a semi-circular cross section with the internal surface having a small diameter portion and a large cross section portion communicating concentrically to the small diameter portion. The rod material is then heated to a temperature equal to or greater than the softening point of the matrix material. The heated material is then pressed to form a half round bar from the material, and cooled to a temperature lower than the softening point of the matrix material; and finally, the cooled rod material is removed from the mold chamber.

39 Claims, 15 Drawing Sheets

METHOD FOR PRODUCING FRP SCREW-LIKE FASTENING ELEMENTS

BACKGROUND OF THE INVENTION

The present invention relates to a method for producing FRP screw-like fastening elements. The screw-like fastening elements include various screws and rivets. These screws and rivets may be preferably used for aircraft or the like.

Screws made of plastic material have been utilized in various field, for example the aircraft field, because of their lightness and high corrosion resistance. As the name FRP (fiber reinforced plastic) suggests the plastic material is frequency reinforced with fibers in order to improve the mechanical strength. Carbon fibers are mainly utilized as the reinforcement fibers.

Conventionally, FRP screws are manufactured in such a method that a rod plastic material including carbon fibers embedded along the length of the rod is prepared, and then a thread or threads are formed on an outer peripheral surface of the material by machining.

However, when the thread or threads are formed, the fibers which are embedded at a radial outer portion to be the thread groove are torn to pieces. Thus the thread portion has a low mechanical strength in comparison with that of the bulk of the screw. The thread portion does not have enough reinforcement advantage, so it is fragile and can be broken sometimes.

In this regard, another manufacturing method for FRP screws was proposed. As shown in FIG. 1, first, high strength fibers 2 are applied into a matrix of thermoplastic resin 4. The thermoplastic resin 4 is formed by extrusion molding or drawing into a rod material 6. In this time, fibers 2 are arranged in a row along a direction of the length of the rod material 6. The thermoplastic resin 4 is a light and strong material, e.g., a polyether-etherketone resin. The fibers 2 are, e.g., carbon fibers. The material 6 preferably includes carbon fibers 4 constituting 30–80% of the weight, and more preferably 60–70%.

Next, the rod material 6 is cut to have a prescribed length and disposed into a metallic mold 8 as shown in FIGS. 2 and 3. The mold 8 comprises a pair of half mold members 10 and 12. Each of the mold members 10 and 12 includes a semi-circular mold surface which has small grooves carved therein, the grooves forming a thread and threads when the half separated mold members 10 and 12 are combined together. As shown in FIGS. 4 and 5, the material 6 is heated and pressed between the half mold members 10 and 12, to form a screw 14 which has a thread and threads shaped by the small groove. Then, mold members 10 and 12 are separated again to take out the manufactured screw 14. The thread portion includes fibers 2 which are not damaged, having sufficient strength.

However, in the above method, if the plastic material 4 is excessive, the manufactured screw 14 will have burrs 16, so that it is necessary to deburr or reject the screw. If the plastic material is insufficient, the screw will be defective and must be rejected.

Furthermore, the pressure to form the screw 14 is limited by the capacity of the mold and the volume of the material. The pressure is also limited in order prevent the occurrence of deburr 16. Therefore, the material 6 is not subjected to a large pressure. If the material 6 includes defects such as cavities, the cavities may remain in the manufactured screw 14. Consequently, the manufactured screw 14 sometimes does not have a prescribed strength.

In addition, the above-described method is not suitable for producing a screw with a head, because the rod material 6 is originally of a uniform cross section.

SUMMARY OF THE INVENTION

Accordingly, it is an object of the present invention to provide a method for producing an FRP screw-like fastening element which has sufficiently strong threads.

It is another object of the present invention to provide a method for producing an FRP screw-like fastening element, in which it is easy to manage the accuracy of the element's dimensions, so that any deburring is unnecessary, and no screws are rejected.

It is a further object of the present invention to provide a method for producing an FRP screw-like fastening element with a head, and in which is easy to manage the accuracy of the screw's dimensions.

According to a method of producing an FRP screw of a first embodiment of the present invention, the method comprises the steps of: (a) preparing a rod material including an elongated matrix formed of a plastic material and a plurality of elongated parallel fiber elements embedded within the matrix along the length of the matrix, the fiber elements having melting points substantially higher than the softening point of the matrix; (b) placing the prepared rod material within a cylindrical molding wall in such a manner that the longitudinal axis of the rod material is generally aligned with the axis of the molding wall, the molding wall having an internal thread formed thereon; (c) heating the placed rod material to a temperature not less than the softening point of the matrix; (d) inserting a stick member into the heated rod material along the longitudinal axis of the rod material so as to laterally expand the rod material and to bring the peripheral face of the rod material into contact with the entire molding wall, thereby an external thread is formed on the peripheral face of the rod material; (e) cooling the thread-formed rod material to a temperature lower than the softening point of the matrix; and (f) taking the cooled rod material out of the molding wall.

According to a method for producing an FRP screw of a second embodiment, the method comprises the steps of: (a) preparing a rod material including an elongated matrix formed of a plastic material and a plurality of elongated parallel fiber elements embedded within the matrix along the length of the matrix, the fiber elements having melting points substantially higher than the softening point of the matrix; (b) placing the prepared rod material within a cylindrical molding wall in such a manner that the longitudinal axis of the rod material is generally aligned with the axis of the molding wall, the molding wall defining a generally cylindrical first molding chamber and having an internal thread formed thereon; (c) heating the placed rod material to a temperature not less than the softening point of the matrix; (d) axially pressing the heated rod material so as to laterally expand the rod material and to bring the peripheral face of the rod material into contact with the entire molding wall, whereby an external thread is formed on the peripheral face of the rod material; (e) cooling the thread-formed rod material to a temperature lower than the softening point of the matrix; and (f) taking the cooled rod material out of the molding wall.

In accordance with a method for producing an FRP screw of a third embodiment, the method comprises the steps of: (a) preparing a rod material including an elongated matrix formed of a plastic material and a plurality of elongated parallel fiber elements embedded within the matrix along the length of the matrix, the fiber elements having melting points substantially higher than the softening point of the matrix; (b) placing the prepared rod material into a molding chamber, the molding chamber including an internal surface of a generally semi-circular cross section, the internal surface having an internal thread formed thereon, the rod material being placed in the molding chamber in such a manner that the longitudinal axis of the rod material is generally aligned with the axis of the internal surface of the molding chamber; (c) heating the placed rod material to a temperature not less than the softening point of the matrix; (d) pressing the heated material perpendicularly to the axis thereof by a ram which has a plane surface facing to the internal surface of the molding chamber, thereby forming a half round bar from the material, the half separated round bar being generally in the form of half a round bar that has been cut at a plane including a center axis thereof, the half bar having an external thread on the peripheral face thereof; (e) cooling the thread-formed half round bar to a temperature lower than the softening point of the matrix; (f) taking the cooled half round bar out of the molding chamber: and (g) joining the half round bar to another half round bar which is processed similarly to the half round bar to form a generally full cylindrical material the full cylindrical material having an external thread thereon.

In accordance with a fourth embodiment for producing an FRP screw of the present invention, the screw to be produced has a thread portion and a head of which the cross section is larger than that of the thread portion. The method includes the following steps of a primary molding process and secondary molding process. The primary molding process includes the following steps of: (a) preparing a rod material including an elongated matrix formed of a plastic material and a plurality of elongated parallel fiber elements embedded within the matrix along the length of the matrix, the fiber elements having melting points substantially higher than the softening point of the matrix; (b) placing the prepared rod material of the screw into a molding chamber, the molding chamber including an internal surface of a semi-circular cross section, the internal surface having a small diameter portion and a large cross section portion communicating concentrically to the small diameter portion, the material being placed in the molding chamber in such a manner that the longitudinal axis of the rod material is generally aligned with the axis of the internal surface of the molding chamber; (c) heating the placed rod material to a temperature not less than the softening point of the matrix; (d) pressing the heated material perpendicularly to the axis thereof by a ram which has a plane surface facing to the internal surface of the molding chamber, thereby forming a half round bar from the material, the half round bar being generally in a form of half a round bar that has been cut at a plane including a center axis thereof, the half bar having an end portion and other portion, the end portion being of a radius larger than the radius of the other portion; (e) cooling the half round bar to a temperature lower than the softening point of the matrix; and (f) taking the cooled rod material out of the molding chamber. The secondary molding process includes the following steps of: (g) joining the half round bar to another half round bar which is processed similarly to the half round bar to form a generally full cylindrical material, the full cylindrical material having a head portion of a larger cross section constituted by the end portion; (h) placing the full cylindrical material within a cylindrical molding wall in such a manner that the longitudinal axis of the rod material is generally aligned with the axis of the molding wall, the molding wall including a large cross section portion for receiving the head portion and small diameter portion having an internal thread formed thereon to receive the portion except for the head portion of the full cylindrical material; (i) heating the placed full cylindrical material to a temperature not less than the softening point of the matrix; (j) inserting a stick member into the heated full cylindrical material along the longitudinal axis of the full cylindrical material so as to laterally expand the full cylindrical material and to bring the peripheral face of the full cylindrical material into contact with the entire molding wall, thereby an external thread is formed on the peripheral face of the full cylindrical material; (k) cooling the thread-formed full cylindrical material to a temperature lower than the softening point of the matrix; and (l) taking the cooled full cylindrical material out of the molding wall.

According to the fourth embodiment, a rivet can be produced as well as the screw. The rivet to be produced has a shank portion and a head with a cross-section larger than that of the shank portion. In accordance with the fourth embodiment for the rivet, the method comprises the steps of: (a) preparing a rod material including an elongated parallel fiber elements material and a plurality of elongated parallel fiber elements embedded within the matrix along the length of the matrix, the fiber elements having melting points substantially higher than the softening point of the matrix; (b) placing the prepared rod material of the rivet into a molding chamber, the molding chamber including an internal surface of a semi-circular cross section, the internal surface having a small diameter portion and a large cross section portion communicating concentrically to the small diameter portion, the material being placed in the molding chamber in such a manner that the longitudinal axis of the rod material is generally aligned with the axis of the internal surface of the molding chamber; (c) heating the placed rod material to a temperature not less than the softening point of the matrix; (d) pressing the heated material perpendicularly to the axis thereof by a ram which has a plane surface facing to the internal surface of the molding chamber, thereby forming a half round bar from the material, the half round bar being generally in the form of half a round bar that has been cut at a plane including a center axis thereof, the half bar having an end portion and the other portion, the end portion being of a radius larger than the radius of an other portion; (e) cooling the half round bar to a temperature lower than the softening point of the matrix; (f) taking the cooled rod material out of the molding chamber: and (g) joining the half round bar to another half round bar which is processed similarly to the half round bar to form a generally fully cylindrical material, the fully cylindrical material having a head portion of a larger cross section constituting the end portion.

DETAILED DESCRIPTION OF THE PREFERRED EMBODIMENTS

Various preferred embodiments of the present invention will be described hereinafter with reference to accompanying drawings.

First Embodiment

A first embodiment is described as follows. First, as well as conventional method shown in FIG. 1, high strength elongated fibers 2 are applied into a matrix of thermoplastic resin 4. The thermoplastic resin 4 is formed by extrusion molding or drawing to form a rod material 6 of a circular cross section. At this time, fibers 2 are parallely arranged in a row along a direction of the length of the material 6. The thermoplastic resin 4 is a light and strong material, e.g., a polyether-etherketone resin. The fibers 4 are, e.g., carbon fibers. The material 6 preferably contains the fibers 2 constituting 30–80% of the material's weight. More preferably, the material 6 contains the fibers constituting 60–70% of the material's weight.

Figure 6:
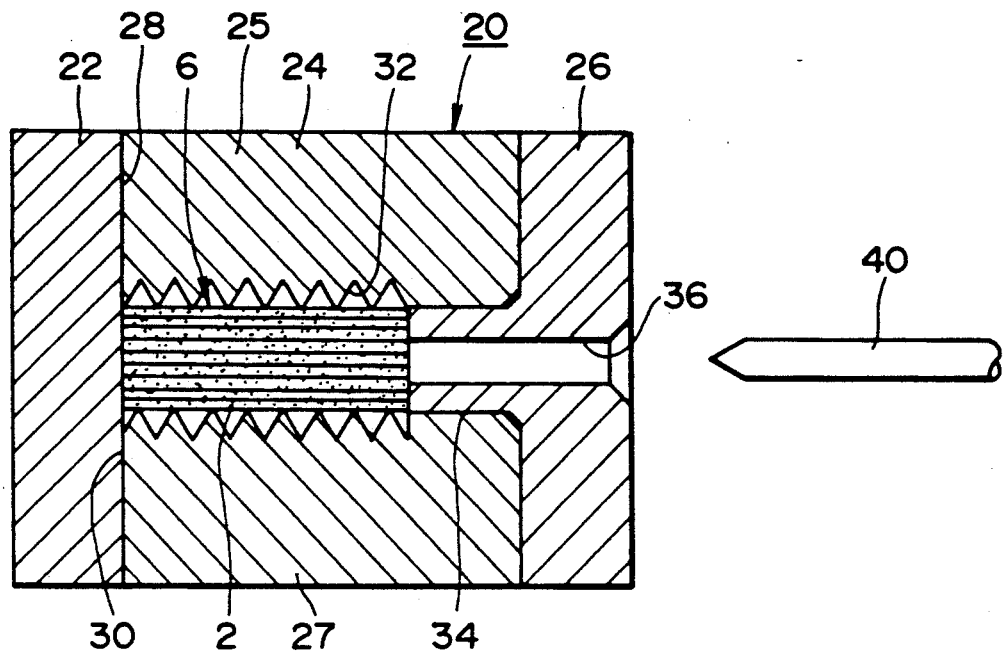
FIG. 6 is a sectional side elevation showing a metallic mold including the material, and a pressure stick used in a method according to a first embodiment of the present invention.

Next, the rod material 6 is cut to a prescribed length and inserted into a metallic mold 20 as shown in FIG. 6, and heated to soften but not to melt. In FIG. 6, the material 6 is cross-sectionally shown together with other elements.

The mold 20 is preferable for producing screws which have no head. The mold 20 consists of a first mold member 22 which has a plane face 28 for forming an end surface of the screw, a second mold member 24 for forming a lateral thread of the screw, and a third mold member 26 for forming another end surface of the screw. The second mold member 24 consists of a pair of half mold members 25 and 27 which are generally symmetric to each other and can be separated from each other. When the half mold members 25 and 27 are combined together, the second mold member 24 has a plane 30 which adequately fits against the plane face 28 of the first mold member 22, and a through hole 32 which is perpendicularly extending from the plane 30. The through hole 32 has an axis on a plane on which the half mold members 25 and 27 contact each other. The through hole 32 has an internally threaded portion and a circular smooth hole portion which are concentric to each other. The smooth hole portion, which is farther from the first mold member 22, is of a smaller diameter than the minor diameter of the internal thread portion. The third mold member 26 has a cylinder-shaped projection 34 which can be inserted into and adequately fits the smooth hole portion of the hole 32. The third mold member 26 has a guide hole 36 extending therethrough which is concentric with the projection 34, i.e., which is concentric with the hole 32. The rod material 6 is placed into the internally threaded portion of the hole 32 in such a manner that the longitudinal axis of the rod material 6 is generally aligned with the axis of the hole 32.

Figure 7:
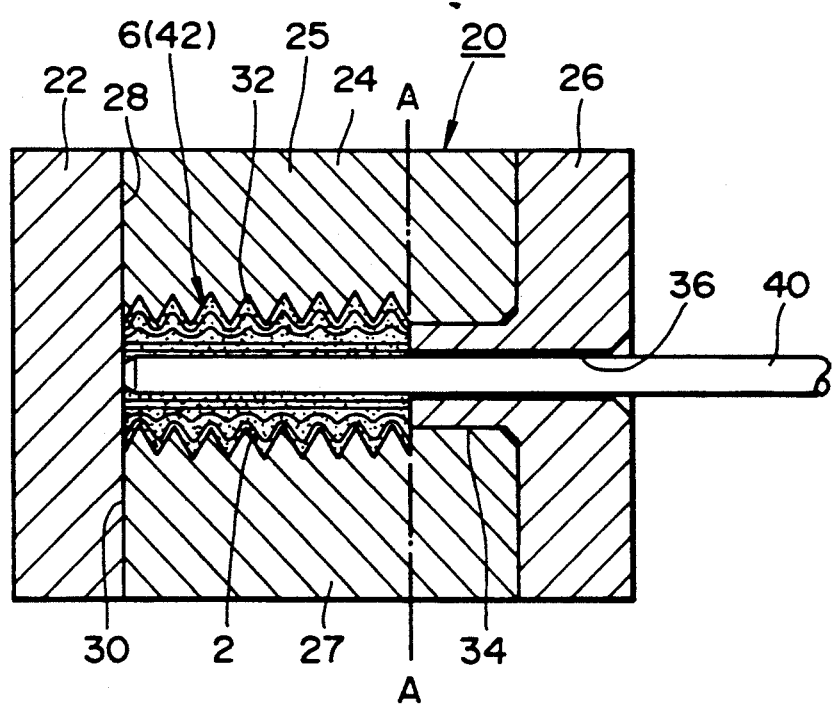
FIG. 7 is a sectional side elevation showing the mold and the stick during the molding process.

After that, a pressure stick 40 of a circular cross section is inserted into the guide hole 36, by a pressure device (not shown). The stick 40 is further advanced to be inserted into the heated rod material 6 along the longitudinal axis thereof as shown in FIG. 7. The stick 40 radially expands the rod material 6 and brings the peripheral face of the rod material 6 into contact with the entire threaded portion of the hole 32 so that the rod material 6 can have a thread on the peripheral surface so as to form a screw 42. The stick 40 remains and is embedded in the screw 42 so as to form a core of the screw 42. The forward end of the stick 40 is preferably sharpened like a pencil for smooth insertion.

The screw 42 is cooled to harden. The half mold members 25 and 27 of the second mold member 24 are separated from each other, to remove the screw 42. The stick 40 is cut along the end surface, that is A—A surface of the screw 42. At the end surface of the screw 42, a slit to be engaged with a screwdriver may be inscribed by machining. The stick 40 is preferably made of high compressive strength material, such as a steel or FRP similar in properties to the main portion of the screw 42. For exerting a high pressure on the screw 42, steel is more preferable for the material of the stick 40. However, in order to make light screws 42, FRP is more preferable as the material of the stick 40. It may be preferable to insert a steel stick into the rod material 6 and then replace the steel stick by an FRP stick as the core. The dimensions of the stick 40 are selected to be suitable for the dimensions of the screws 42, so as to produce adequate radial pressure to expand the rod material 6 into the internal thread of the second mold member 24.

In accordance with the method for producing FRP screws of the embodiment of the present invention, the fibers 2 remain uncut from one end to another end of the screw 42. The fibers 2 near the peripheral thread of the screw 42 are held in the thread form in such a manner that the fibers 2 bent to follow the zigzag (wavy cross sectional figure) of the thread of the screw 42. The pressure stick 40 exerts sufficient pressure on the material 6 (screw 42). Therefore, strong FRP screws with a similar strength thread portion can be produced. Furthermore, it is easy to manage the accuracy of the screw's dimensions.

If the stick 40 has a mechanical strength which is in excess of that of the FRP, the manufactured screw 42 with the stick 40 has higher tensional strength along its axis than that of the conventional screws which is made of only FRP.

While the stick 40 is cut off at the end surface of the screw 42 in the above embodiment, a stick which has a same length as the screw 42 can be used to omit the cutting process.

Figure 8:
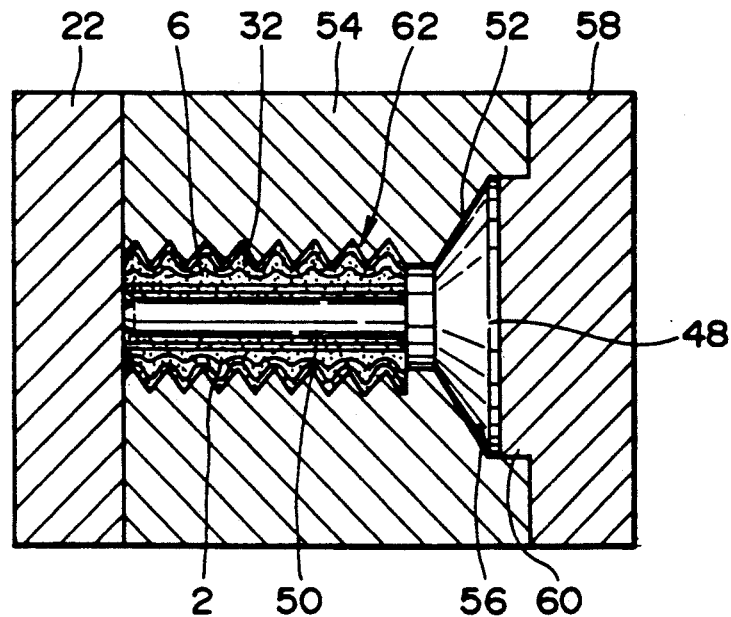
FIG. 8 is a sectional side elevation showing another metallic mold including the material, and another stick used in a modification of the first embodiment, during the molding process.
Figure 2:
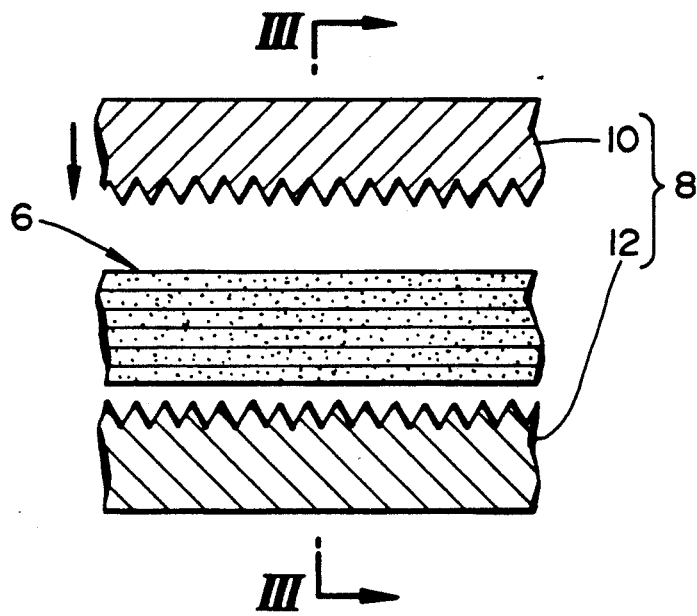
FIG. 2 is a sectional side elevation showing a metallic mold for producing the FRP screws according to the prior art.
Figure 3:
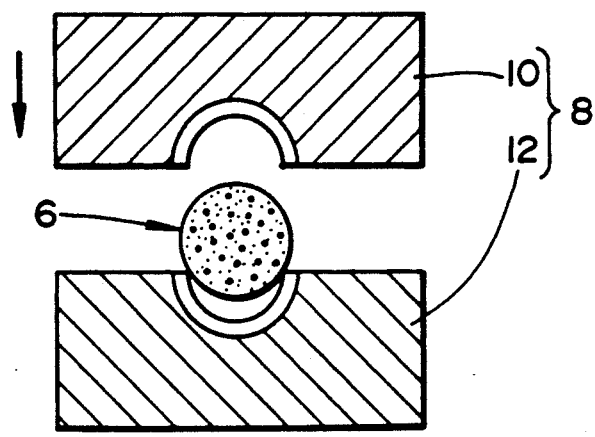
FIG. 3 is a cross-sectional view showing the mold along the III—III line of FIG. 2.
Figure 4:
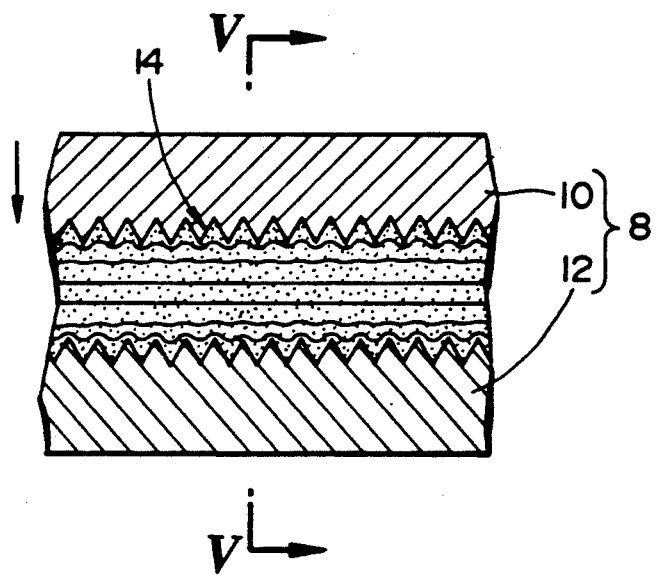
FIG. 4 is a sectional side elevation showing the metallic mold during production of an FRP screw.
Figure 5:
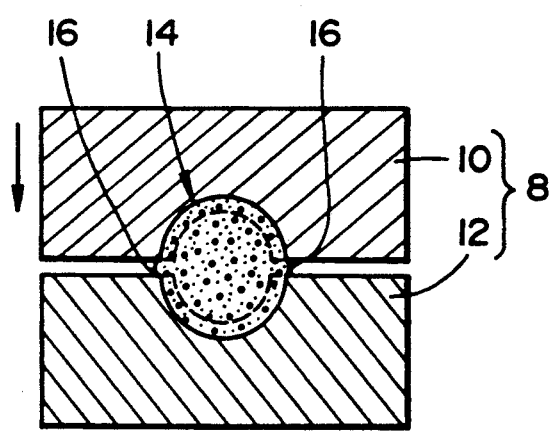
FIG. 5 is a cross-sectional view showing the mold along the V—V line of FIG. 4.

While the manufactured screw 42 has no head in the mentioned embodiment, a screw with a head can be manufactured as follows. In the method, the pressure stick has a head to be a counter sunk head of a screw when the stick is inserted into and embedded in the rod material. As shown in FIG. 8, in this regard, the stick 48 includes a rod core portion 50 whose end is preferably sharpened like a pencil, and head portion 52 which is in form of a counter sunk head of the screw and concentric to the core portion 50. Although the first mold member 22 is the same as that in FIGS. 6 and 7, the second mold member 54 which is separable the same as the second mold member 24 has a conical hollow 56 being concentric with the hole 32, for fitting the head portion 52. The third mold member 26 is substituted by a ram 58. The ram 58 has a circular projection 60 for thrusting the stick 48 into the material 6.

Using the mold shown in FIG. 8, the screw which has a counter sunk head is produced as follows. The material 6 is inserted into and placed in the threaded hole 32 of the second mold member 54 and heated to soften; and then the stick 48 is pushed by the ram 58 and inserted into the material 6. Consequently, the screw 62 can be manufactured in such a manner that the core portion 50 of the stick 48 is embedded in the screw's threaded portion, and the head portion 52 becomes the head of the screw 62. When the screw 62 is cool, the second mold member 54 is separated to remove the screw 62.

Figure 34:
FIGS. 34 and 35 are side views showing modifications of the pressure stick used in the first and fourth embodiments of the present invention.
Figure 35:

In the first embodiment, the stick 40 is of a simple circular cross section as shown in FIGS. 6 and 7. However, in order to improve physical contact between the remained stick 40 and the produced screw 42, the stick 40 preferably is of a shape shown in FIGS. 34 or 35. The stick 40 shown in FIG. 34 has a plurality of projections on the outer peripheral surface thereof. The projections are spaced apart from each other along the axis of the stick 40. The stick 40 shown in FIG. 35 has a thread formed on the outer peripheral surface thereof. Accordingly, slipping between the remained stick 40 and the screw 42 are prevented for producing the screw having high tensile strength.

Second Embodiment

Figure 1:
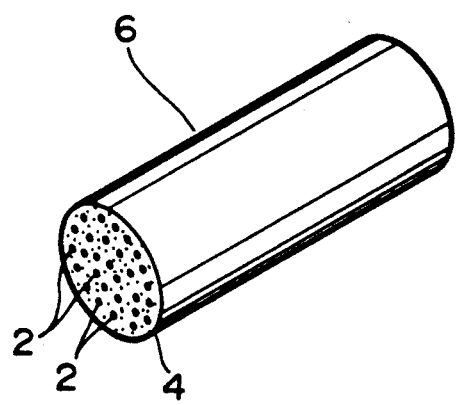
FIG. 1 is a perspective view showing a screw-like fastening element of a material such as FRP according to the prior art and also according to various preferred embodiments of the present invention.

Next, a second embodiment of the present invention will be described referring to FIGS. 1 and 9 through 13. The material 6 shown in FIG. 1 is also utilized in the second embodiment.

Figure 9:
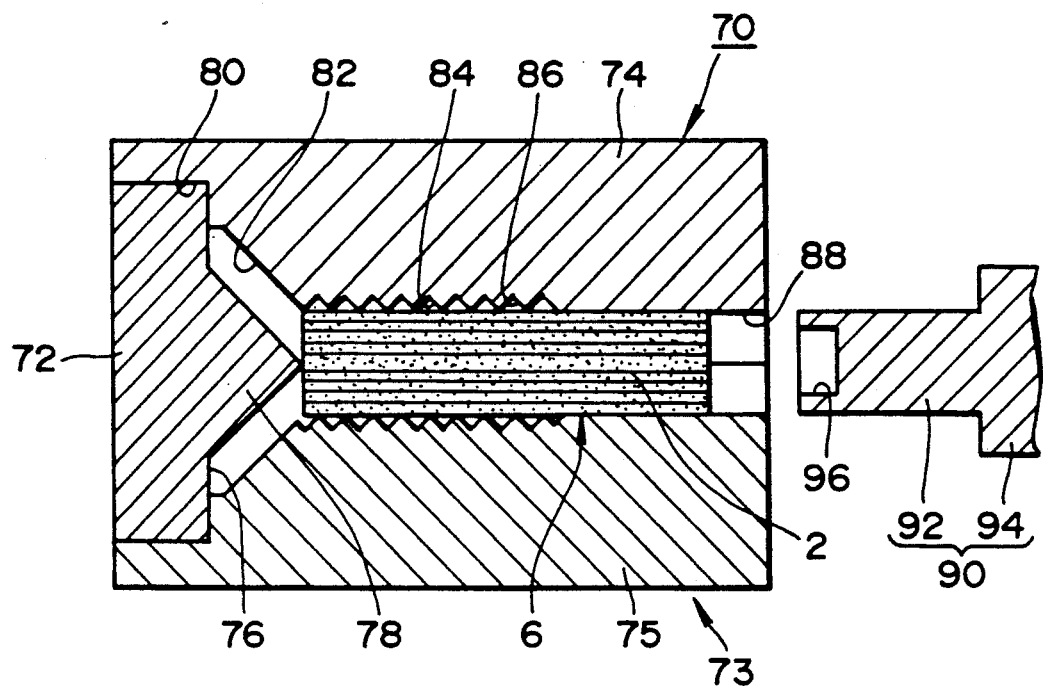
FIG. 9 is a sectional side elevation showing a metallic mold including the material, and a ram used in a method according to a second embodiment of the present invention.
Figure 10:
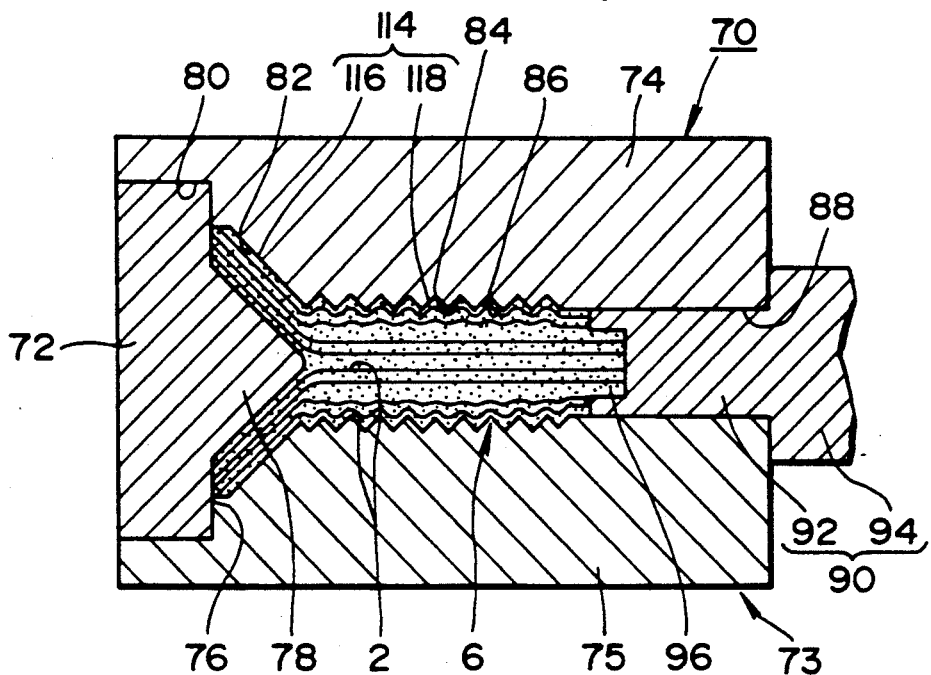
FIG. 10 is a sectional side elevation showing the mold and ram during a primary molding process of the second embodiment.

As shown in FIGS. 9 and 10, a mold 70 for molding a screw consists of a first mold member 72 for producing a cone-shaped head of the screw, and a second mold member 73 for producing a thread portion of the screw. The first mold member 72 includes a circular plate 76 for producing an edge of the head, and a cone-shaped projection 78 concentrically extending from the plate 76.

The second mold member 73 consists of a generally symmetric half separated upper and lower mold members 74 and 75. When the upper and lower mold members 74 and 75 are combined together, the second mold member 73 includes a circular positioning hole 80 which is adequate to be held in engagement with the circular plate 76 of the first mold member 72 and perpendicular to circular plate 76, a conical hollow 82 which is concentric to the positioning hole 80, and a through hole forming a first molding chamber 84 of a circular cross section and partially threaded, which is concentric to the positioning hole 80. The axis of the hole 80, hollow 82, and the hole 84 is on a plane in which the half mold members 74 and 75 contact each other. When the first and second mold members 72 and 73 are combined together, the apex of the cone-shaped projection 78 is located on the axis and the conical hollow 82 is parallel to and spaced apart from the cone-shaped projection 78, so that a conical second molding chamber in direct communication with the through hole 84 is formed therebetween. The through hole 84 includes an internal female threaded portion 86 at the end near the conical hollow 82, and a smooth portion 88 at the opposite end. The diameter of the smooth portion 88 is smaller than the minor diameter of the internal thread 86.

The rod material 6 is cut off to have a prescribed length and inserted into the hole 84 of the second mold member 73 in such a manner that the longitudinal axis of the rod material 6 is generally aligned along with the axis of the hole 84. Then, a primary molding process begins. The material 6 is heated to soften. Next, a ram 90 is advanced and inserted into the hole 84 by a pressure device (not shown). The ram 90 has a rod-like presser 92 of a circular cross section and a flange 94 concentrically attached to the presser 92. The presser 92 is of a length and a diameter the same as that of the smooth portion 88. The presser 92 has a circular recess 96 at the forward end thereof, whose diameter is smaller than that of the material 6. The depth of the recess 96 is selected to suit the capacity of the mold 70, the volume of the material 6, and the desired pressing ratio of the material 6.

Accordingly, the heated material 6 is axially pressed by the ram 90 as shown in FIG. 10. One end of the material 6 which is closer to the first mold member 72 spreads and broadens around the projection 78 and is injected into the second molding chamber under the guidance of the projection 78 and the hollow 82. Especially, because of the hole 96, the outer of the material 6 effectively flows into space. The rod material 6 also radially expands and the peripheral surface thereof is brought into contact with the threaded portion 86, whereby an external thread is formed on the peripheral surface. The flange 94 stops at an end surface of the second mold member 73.

Therefore, a half-finished screw 114 which has a cone-shaped head wall 116 and a thread portion 118 concentrically attached to the head wall 116 is produced from material 6. At the head wall 116, the continuous carbon fibers 2 align along the projection 78 and hollow 82. At the outer region of the thread portion 118, the fibers align along the zigzag of the thread. At the inner region of the thread portion 118, the fibers align along the screw's axis.

Figure 11:
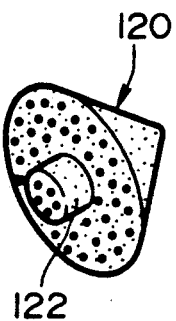
FIG. 11 is a perspective view showing a head core to be embedded into a product made by the primary molding process.
Figure 12:
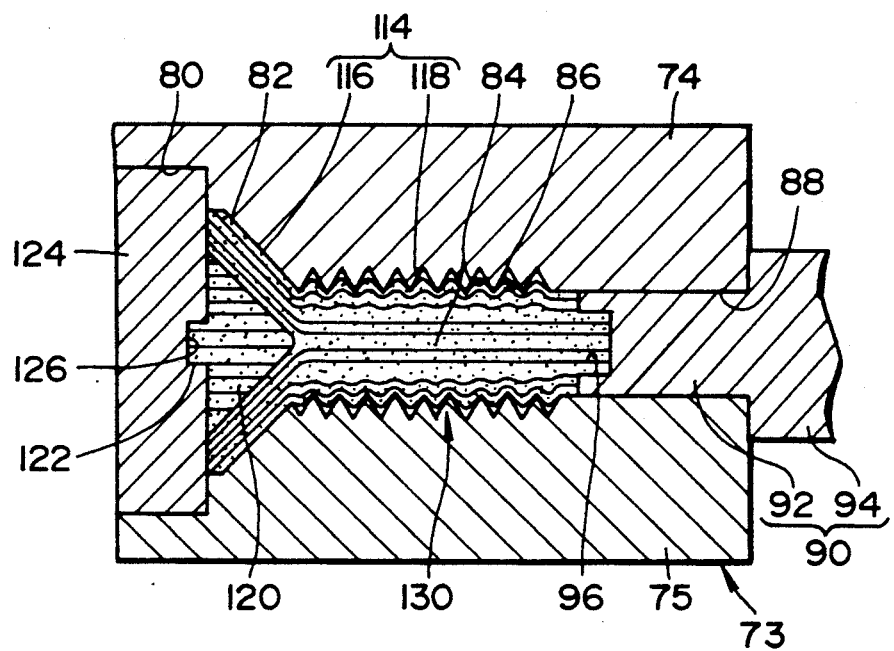
FIG. 12 is a sectional side elevation showing the mold and ram during a secondary molding process for uniting the product and the head core.

Then, the first mold member 72 is released from the second mold member 73. Next, a secondary molding process begins. A cone-shaped head core 120 shown in FIG. 11 is embedded into the cone-shaped head wall 116 in a coaxial relation. The head core 120 is made of FRP which is similar to the material 6. The head core 120 includes a positioning projection 122 at the center of a bottom surface thereof. The head core 120 is inserted into the head wall 116 of the half-finished screw 114 which still rests in the second mold member.

A forth mold member 124 is combined with the second mold member 73. The forth mold member 124 is a circular plate which is adequate to be fitted into the positioning hole 80 of the second mole member 73. The fourth mole member 124 has a positioning aperture 126 at the center of one of its plane surfaces, which engages with the positioning projection 122 of the head core 120. Thus, the half-finished screw 114 and head core 120 is surrounded by the second mold member 73 and the fourth mold member 124, in the manner that the half-finished screw 114 and the head core 120 is combined.

Figure 13:
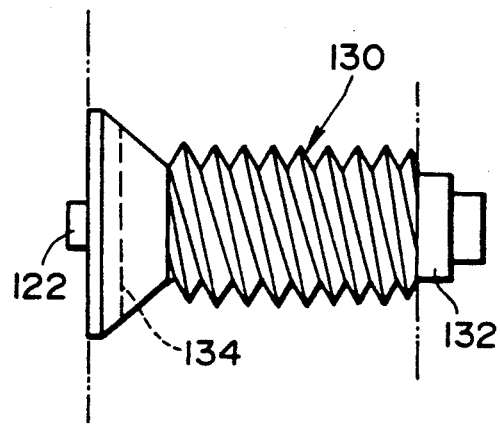
FIG. 13 is side view showing a unitary screw made by the secondary molding process.

The half-finished screw 114 and the head core 120 are heated to be soft. The ram 90 is inserted into the hole 84 again, and presses the half-finished screw 114 and the heat core 120 to make them into a unitary screw 130. After the united screw 130 is cooled, the fourth mold member 124 is released from the second mold member 73, and the upper and lower mold members 74 and 75 of the second mold member 73 are separated from other, thereby enabling the united screw 130 to be taken out. Accordingly, the cone-shape head wall 116 is filled with the head core 120, so that the united screw 130 shown in FIG. 13 is obtained. The united screw 130 has the projection 122, and an unnecessary end portion 132 provided so the material 6 might have sufficient volume to receive a sufficient pressure. Therefore, the projection 122 and the unnecessary end portion is cut off from the main portion of the screw 130, along the two-dot-and-dashed lines in FIG. 13. A slot 134 to be engaged with a screw driver is inscribed at the surface of the head.

In accordance with the method for producing FRP screws of the second embodiment of the present invention, the fibers 2 remain uncut from one end to another of the screw 130. The fibers 2 near the peripheral thread of the screw 130 are held in the thread form in such a manner that the fibers 2 bent to follow the zigzag (wavy cross sectional figure) of the thread of the screw 130. The ram 90 exerts sufficient pressure on the material 6 (screw 130). Therefore, strong FRP screws with a similar strength thread portion can be produced. Furthermore, it is easy to manage the accuracy of the screw's dimensions. It is unnecessary to prepare a material which has a larger cross section portion to be a head and smaller cross section portion to be a thread portion.

Third Embodiment

Figure 14:
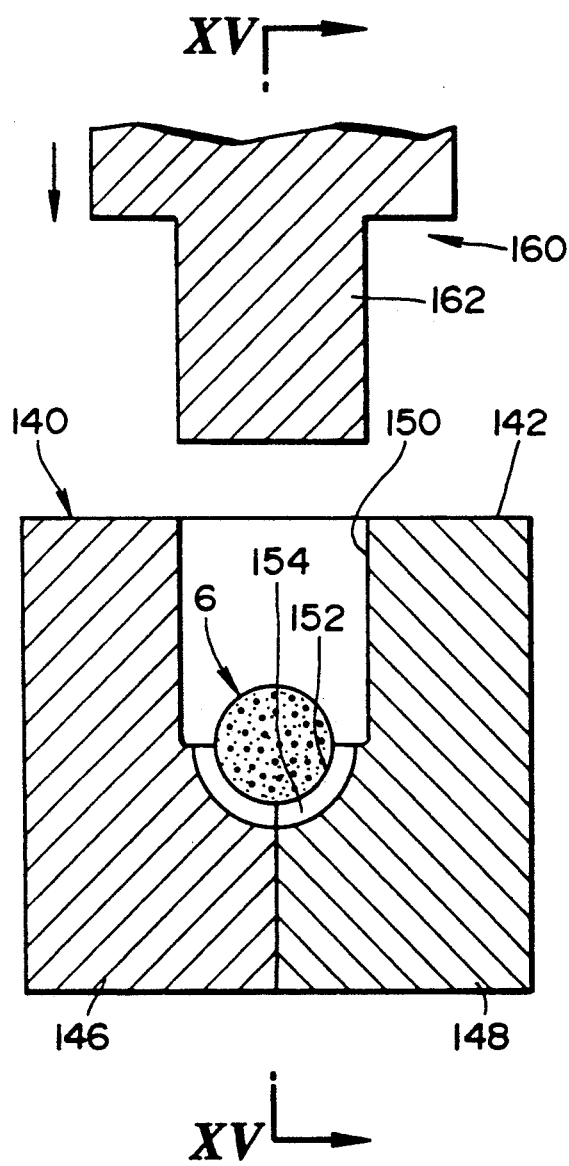
FIG. 14 is a front sectional elevation showing a mold containing the material, and a ram used in a method according to a third embodiment of the present invention.
Figure 15:
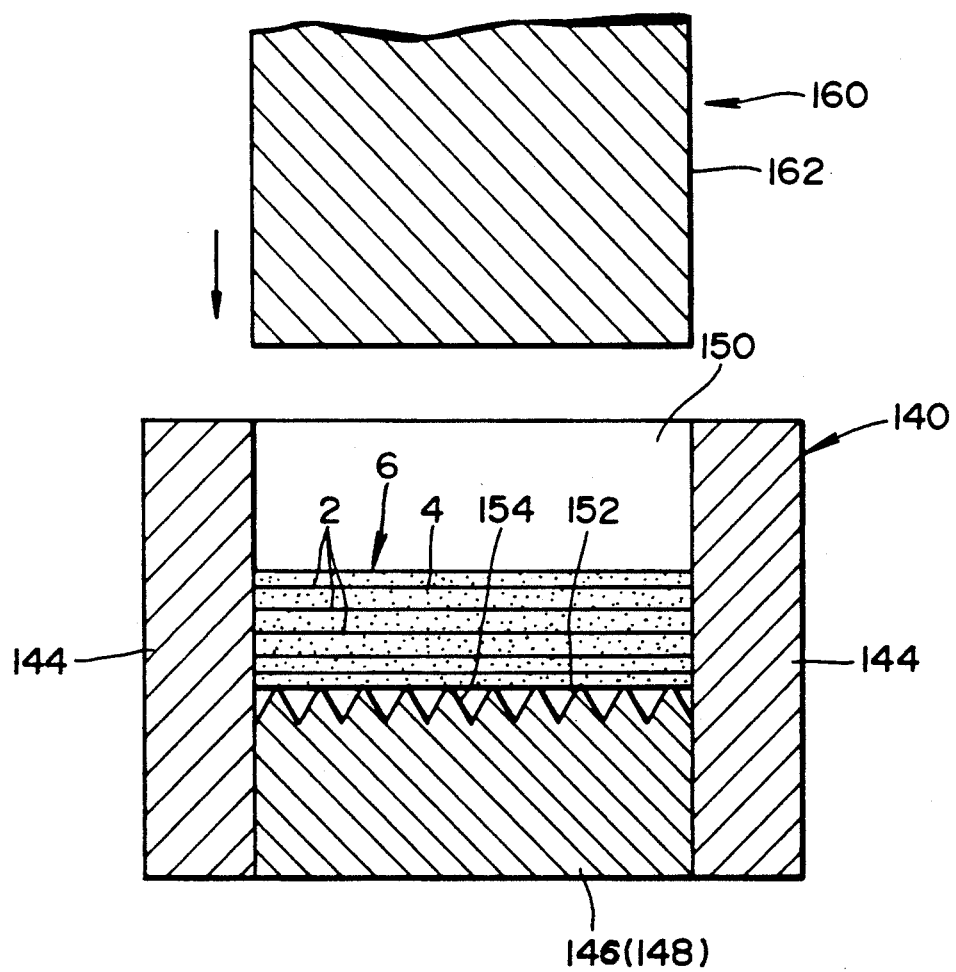
FIG. 15 is a sectional side elevation showing the mold and ram along the XV—XV line of FIG. 14.

The third embodiment of the present invention will be described hereinafter, referring to FIGS. 1 and 14 through 19. In the third embodiment, a screw without a head may be produced. The material of the screw is the same as shown in FIG. 1. The material 6 is cut off to a prescribed length, and then laid on and placed into a mold 140 as shown in FIGS. 14 and 15. The mold 140 consists of a rectangular solid-shaped thread mold member 142 for producing the lateral thread of the screw to be manufactured, and two plate-like end mold members 144 for producing the end portions of the screw, which are attached to both sides of the thread mold member 142. The thread mold member 144 consists of two separable half mold members 146 and 148 which are generally symmetrical with each other, for enabling the smooth removal of the manufactured screw. When the half mold members 146 and 148 are combined together, the thread mold member 144 has a guide groove 150. A semi-circular surface 152 exists at the bottom of the guide groove 150. The semi-circular surface 152 includes a center axis located in a plane in which the half mold members 146 and 148 contact each other. The semi-circular surface 152 has small grooves 154 for producing a thread of the screw. The width of the guide groove 150 is slightly larger than the major diameter of the semi-circular surface 152. The material 6 is placed on the semi-circular surface 152 in such a manner that the longitudinal axis of the material 6 aligns with the axis of the semi-circular surface 152 and is surrounded by the entire mold 140.

Figure 16:
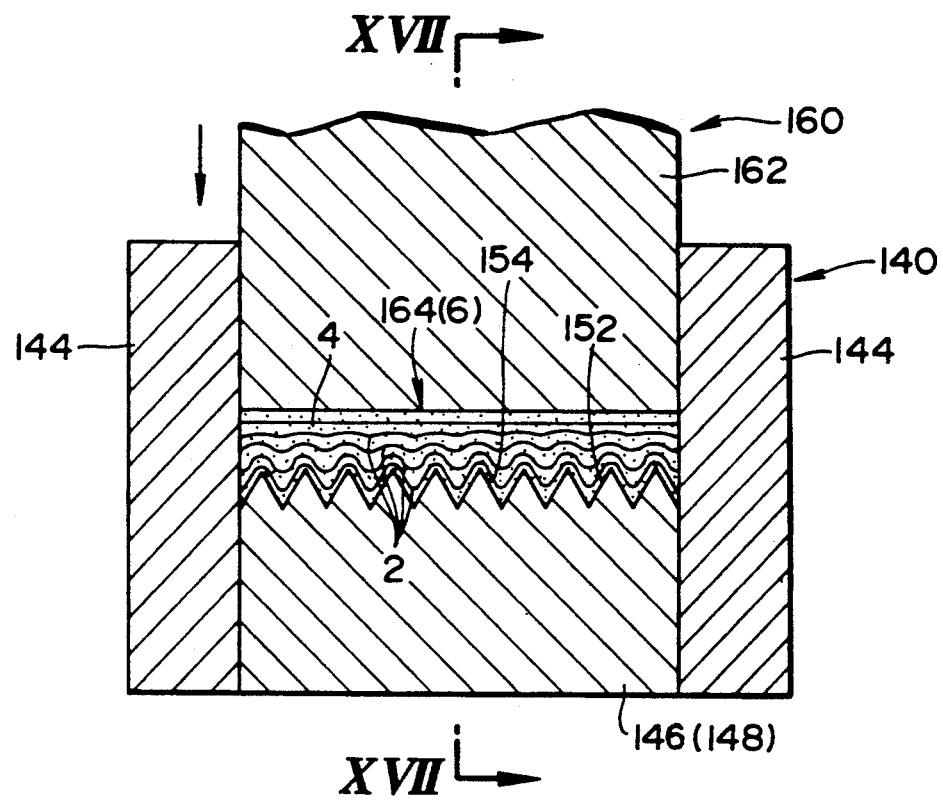
FIG. 16 is a sectional side elevation showing the mold and ram during a molding process.
Figure 17:
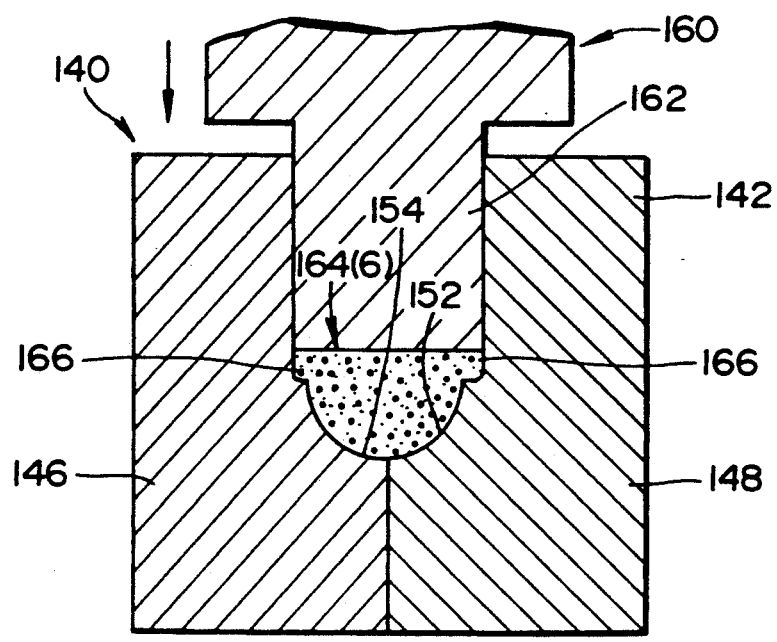
FIG. 17 is a front elevation showing the mold and ram along the XVII—XVII line of FIG. 16.
Figure 18:
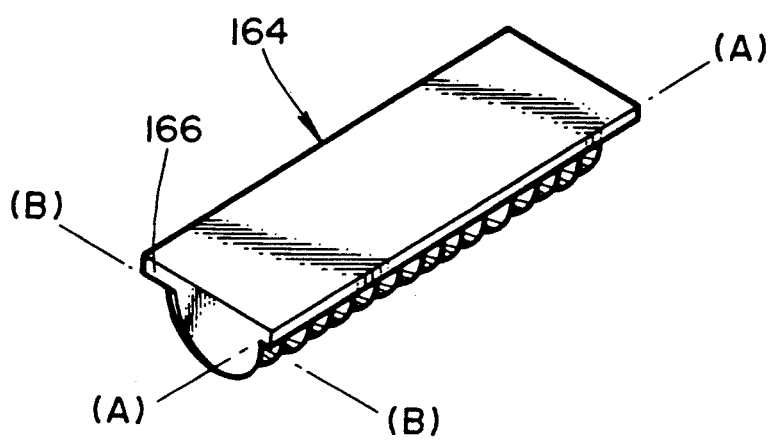
FIG. 18 is a perspective view showing a product made by the molding process, that is, a half round screw.

The material 6 is heated to soften. Then, a ram 160 is downwardly advanced inserted into the guide groove 150. The ram 160 has a presser 162 which is of a shape to engage with the guide groove 160 and of which forward end is plane. As shown in FIGS. 16 and 17, the material 6 is pressed by the presser 162, to be a half screw 164 which has an unnecessary burr 166. The screw 164 is generally in a form of a screw to be cut at a plane including a center axis thereof and the burr 166 laterally and perpendicularly projects from the plane. The unnecessary burr 166 is caused by the material 6 having excess volume for providing sufficient pressure. At the inner portion of the half screw 164, the continuous carbon fibers 2 align along the screw's axis. At the outer portion, the fibers 2 approximately align along the zigzag of the thread of the half screw 164 and remain uncut from one end to another end of the half screw 164.

Figure 19:
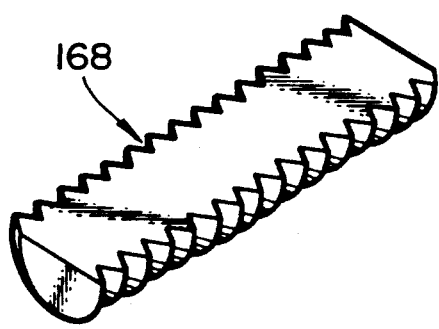
FIG. 19 is a perspective view showing a finished half round screw.

The ram 160 is removed from the mold 140. The end mold members 144 are removed from the thread mold member 142. The half mold members 146 and 148 are separated from each other. Then, the half screw 164 is taken out. Because the half screw 164 has an unnecessary burr 166, the unnecessary portion 166 is cut off by machining, along a surface determined by line (A)—(A) and line (B)—(B) shown in FIG. 18. A complete half screw 168 shown in FIG. 19 is therefore shaped.

The half screw 168 is combined with another one in a manner so that the phase of the thread is aligned to produce a unitary screw without a head. The half screws 168 can be adhere together by a gluing agent, or can be thermally welded together. The unitary screw is finished by inscribed a slot at one end of the unitary screw.

In accordance with the method for producing FRP screws of the third embodiment of the present invention, the fibers 2 remain uncut from one end to another end of the produced screw. The fibers 2 near the peripheral thread of the screw ar held in the thread from in such a manner that the fibers 2 bent to follow the zigzag (wavy cross sectional figure) of the the thread of the screw. The ram 160 exerts sufficient pressure on the material 6 (screw). Therefore, strong FRP screws with a similar strength thread portion can be produced. Furthermore, it is easy to manage the accuracy of the screw's dimensions.

Fourth Embodiment

Figure 20:
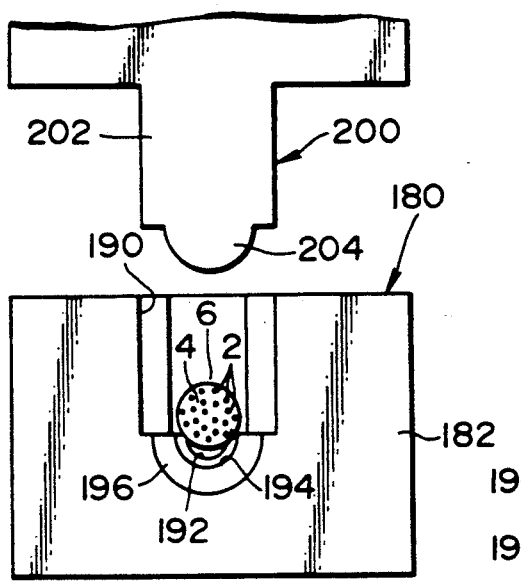
FIG. 20 is a sectional front elevation showing a mold and ram used in a primary molding process of a method according to a fourth embodiment of the present invention.
Figure 21:
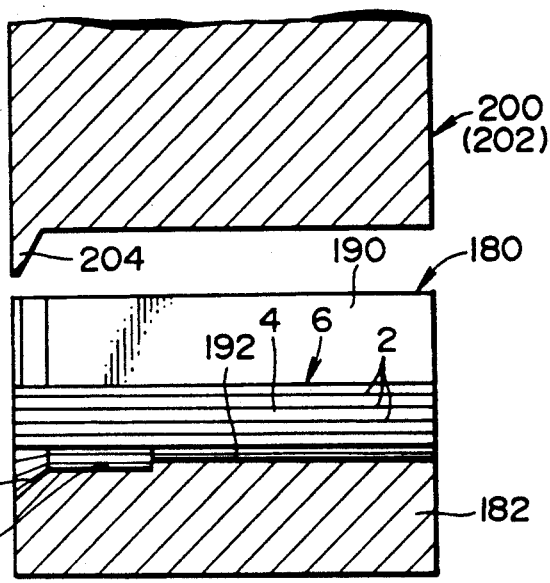
FIG. 21 is a sectional side elevation showing the mold and ram of FIG. 20.

A fourth embodiment of the present invention will be described hereinafter with references to FIGS. 1 and 20 through 30. In the fourth embodiment, the material 6 shown in FIG. 1 is also utilized. The material 6 is cut off to a prescribed length, and then laid on and placed into a mold 180 as shown in FIGS. 20 and 21. A primary molding process begins. As shown in FIGS. 20, 21, and 24, the mold 180 comprises a rectangular solid-shaped lateral mold member 182 for producing the lateral face of a product to be manufactured by the primary molding process. The lateral mold member 182 consists of a pair of separable half molds which are generally symmetric, for enabling the smooth removal of the manufactured product. The lateral mold member 182 has a guide groove 190, the bottom of which is formed in a semi-circular cross section. At the bottom of the guide groove 190, three semi-circular surfaces 192, 194, and 196 which concentrically communicate each other are formed. In other words, from one end to another end of the guide groove 190, a small diameter surface 192, a middle diameter surface 194, and a taper surface 196 are aligned. The small diameter surface 192 whose length is the largest, shapes a portion to be a thread portion of a screw, as described later. The middle diameter surface 194 shapes a portion to be the neck of the screw. The taper surface 196 shapes a portion to be a head of the screw. The taper surface 196 tapers from the end of the lateral mold member 182 to the middle diameter surface 194. The lateral internal surfaces of the guide groove 190 curves in such a manner that the width of the guide groove 190 is slightly larger than the respective surfaces 192, 194, and 196. The material 6 is placed on the surfaces 192, 194, and 196 in such a manner that the longitudinal axis of the material 6 is generally aligned with the axis of the surfaces 192, 194, and 196, and surrounded by the entire mold 180.

The material 6 is heated to soften. Then, a ram 200 is downwardly advanced and inserted into the guide groove 190. The ram 200 has a presser 202, the cross section of which in plan view engages with the guide groove 190. A pressing surface of the presser 202 is generally a plane but has a semi-conical projection 204 which is adequate to fit into the taper surface 196. When the ram 200 is held in engagement with the mold 180, the projection 204 is surrounded by and parallel to but spaced apart from the surface 196.

Figure 22:
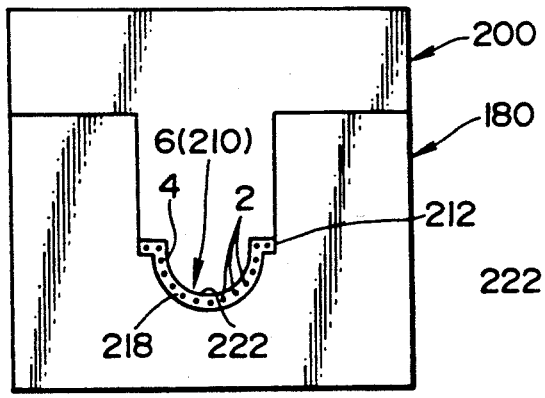
FIG. 22 is a sectional front elevation showing the mold and ram during a primary molding process of the fourth embodiment.
Figure 23:
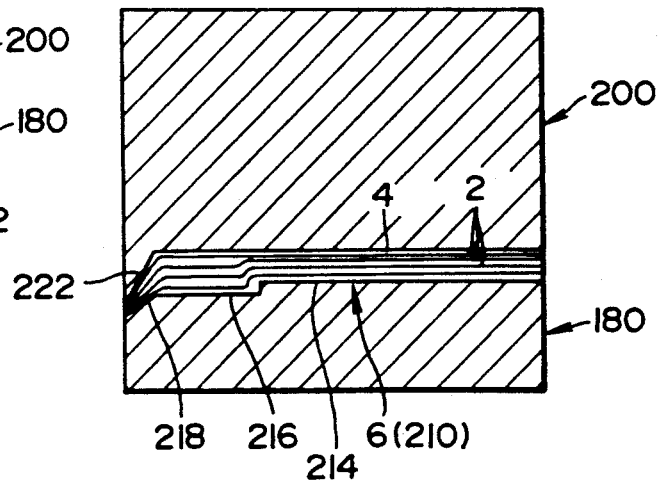
FIG. 23 is a sectional side elevation showing the mold and ram of FIG. 22.
Figure 24:
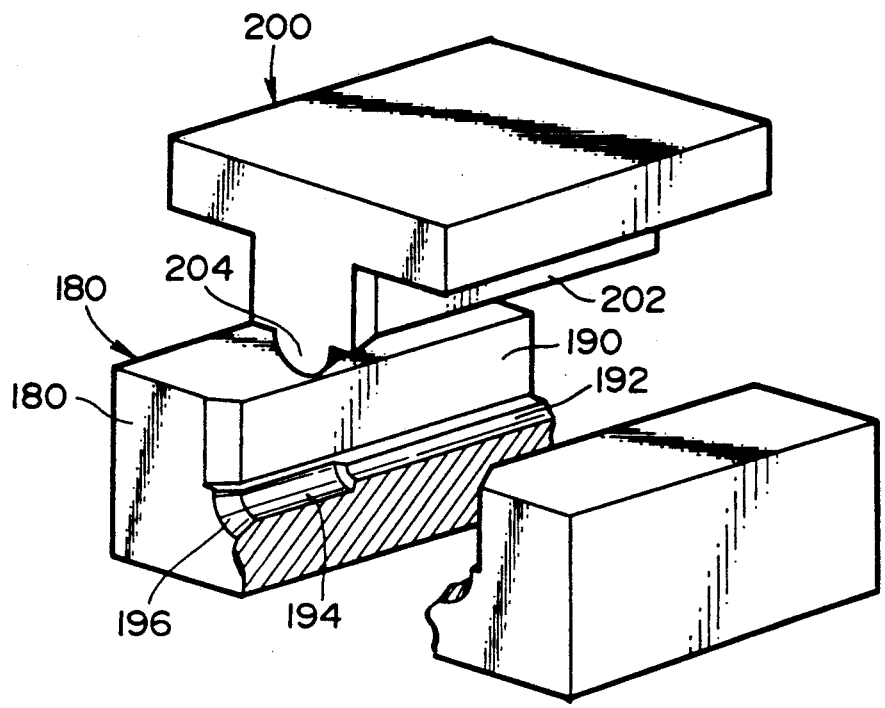
FIG. 24 is a perspective view showing the mold and ram.

As shown in FIGS. 22 and 23, the material 6 is pressed by the presser 202, to be a half shoulder round bar 210 which has an unnecessary burr 212. The unnecessary burr 212 is caused by the material 6 having excessive volume for providing sufficient pressure. The half shoulder round bar 210 is generally in a form of a shoulder round bar cut at a plane including a center axis thereof and the burr 212 laterally and perpendicularly projects from the plane. At the inner portion of the half shoulder round bar 210, the continuous carbon fibers 2 align along the bar's axis. At the outer portion, the fibers generally align along the zigzag of the shoulder and still remain uncut. The half round bar 210 has concentrically and orderly aligned a small diameter portion 214, a middle diameter portion 216, and a taper diameter portion 218 The small diameter portion 214 is to be a thread portion of a screw. The middle diameter portion 216 is to be the neck of the screw. The taper diameter portion 218 is to be a head of the screw. The taper diameter portion 218 tapers from an end of the half shoulder round bar 210 to the middle diameter portion 216. The taper diameter portion 218 has a recess 222 of a semi-circular cross section aligned with the axis of the half bar 212 formed by the projection 204.

Figure 25:
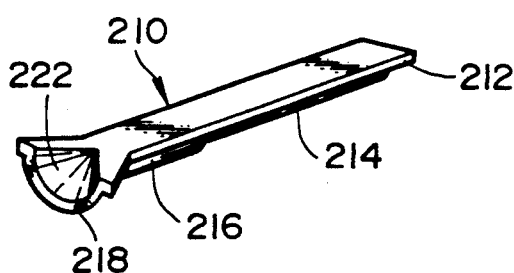
FIG. 25 is a perspective view showing a half shoulder round bar made by the primary molding process.
Figure 26:
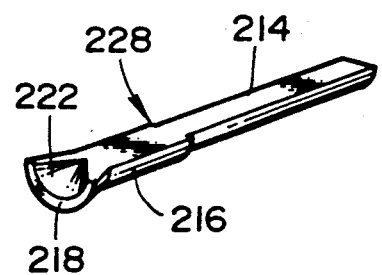
FIG. 26 is a perspective view showing a completed half shoulder round bar that is formed from the half round shoulder bar shown in FIG. 25.

The ram 200 is removed from the mold 180. The elements of the mold 180 are separated from each other for removal of the half shoulder round bar 210, as shown in FIG. 25. Then, the unnecessary burr 212 is cut off by machining. A complete half shoulder round bar 228 shown in FIG. 26 is therefore produced.

Figure 27:
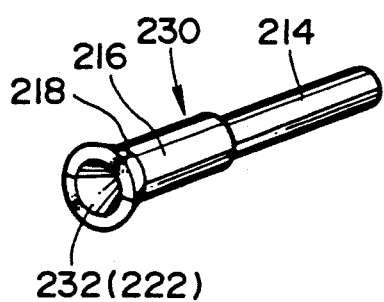
FIG. 27 is a perspective view showing a united shoulder round bar which is made from a pair of the half bars shown in FIG. 26.

As shown in FIG. 27, the half shoulder round bar 228 is combined with another one, so that a unitary shoulder round bar 230 is formed. The shoulder round bar 230 has a head wall which is constituted by the taper portions 218 containing a hollow 232 of a conical shape which is constituted by the recesses 222. The two half shoulder round bars 228 can be adhered together by a gluing agent, or can be thermally welded together.

Figure 28:
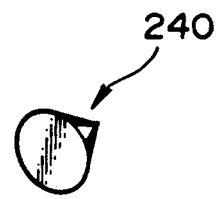
FIG. 28 is a perspective view showing a head core which should be embedded in the united shoulder round bar shown in FIG. 27.

Next, a head core 240 of a conical shape shown in FIG. 28, which can fit into the hollow 232 is inserted an united with the hollow 232 by a gluing agent or thermal welding process. The conical core 240, which is for resistance to lateral transformation of the taper portion 218, is made of an FRP as well as the material 6. The fibers 2 are preferably aligned in a perpendicular direction to the axis of the conical shape of the head core 240.

While a method for producing an FRP screw is described above, the shoulder round bar 230 with the head core 240 can be utilized as a rivet. The rivet 230 has a head portion and shank portion. For use of the shoulder round bar 230 as a screw, the shoulder round bar 230 has to pass the following secondary molding process.

Figure 29:
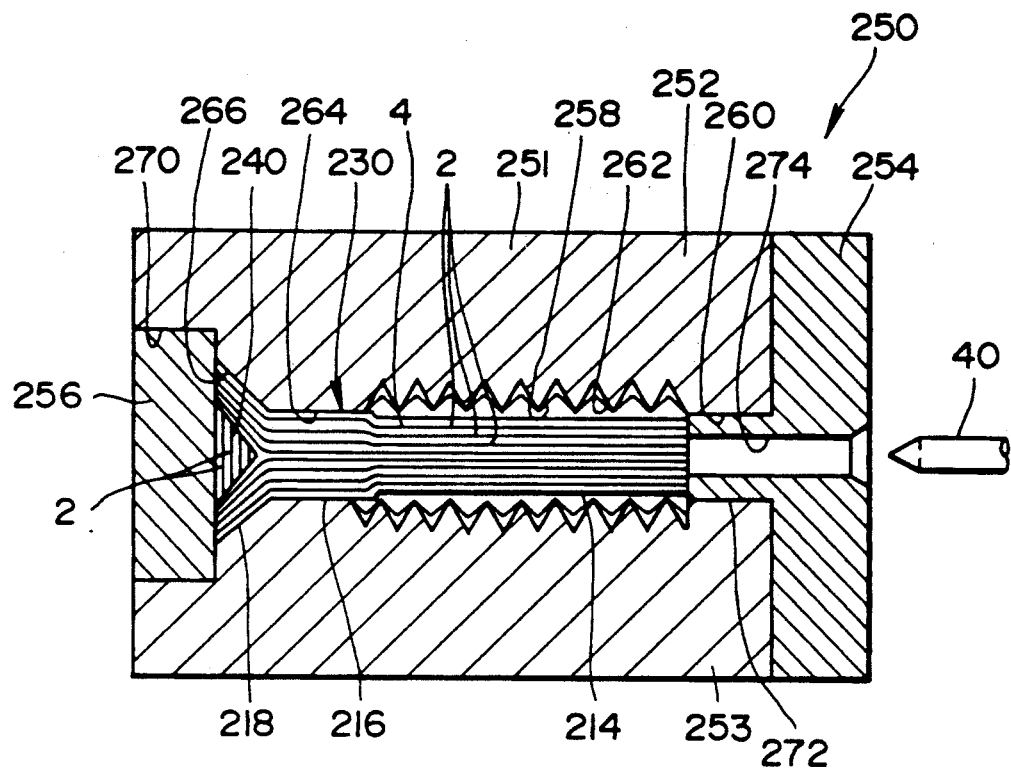
FIG. 29 is a sectional side elevation showing a mold containing the material, and a pressure stick for a secondary molding process of the fourth embodiment.

After uniting the head core 240 and the shoulder round bar 230, a secondary molding for forming a thread of a screw begins. In the secondary molding process, as shown in FIG. 29, the shoulder round bar 230 with the head core 240 are placed in a mold 250. The mold 250 consists of a lateral mold member 251 for forming a lateral face including a thread of a screw and two end mold members 254 and 256 for forming ends of the screw attached to both sides of the lateral mold member 251, respectively. The mold member 251 consists of a pair of half mold members 252 and 253 which are generally symmetric to each other to enabling the smooth removal of the screw to be manufactured. When the half mold members 252 and 253 are combined together, the lateral mold member 251 has a hole 258 of a circular cross section in such a manner that the axis of the hole 258 is located on a plane in which the half mold members 252 and 253 contact each other. The hole 258 includes a smooth small diameter portion 260 for engaging with the end mold member 254, an internally threaded portion 262, another smooth small diameter portion 264, a taper diameter portion 266, and a large diameter portion 270 for engaging with the end mold member 256, which concentrically communicate with each other. The thread portion 262 has threaded grooves to shape a thread portion of a screw to be formed. The small diameter portion 264 shapes a neck of the screw. The taper diameter portion 266 which tapers from the larger diameter portion 270 to the small diameter portion 264 shapes a head of the screw.

The end mold member 254 in the shape of a plate engages with the small diameter portion 260. The end mold member 256 of a shape of a cylindrical plug is held in engagement with the largest diameter portion 270. The end mold member 254 has a projection 272 of a circular cross section to be inserted into the small diameter portion 260, and which cooperates with the end mold member 256 to clamp the shoulder round bar 230 whose axis is generally aligned with the axis of the hole 258. The end mold member 254 includes a through hole 274 axially and concentrically passing through the circular projection 272 as well as the plate portion of the end mold member 254.

Figure 30:
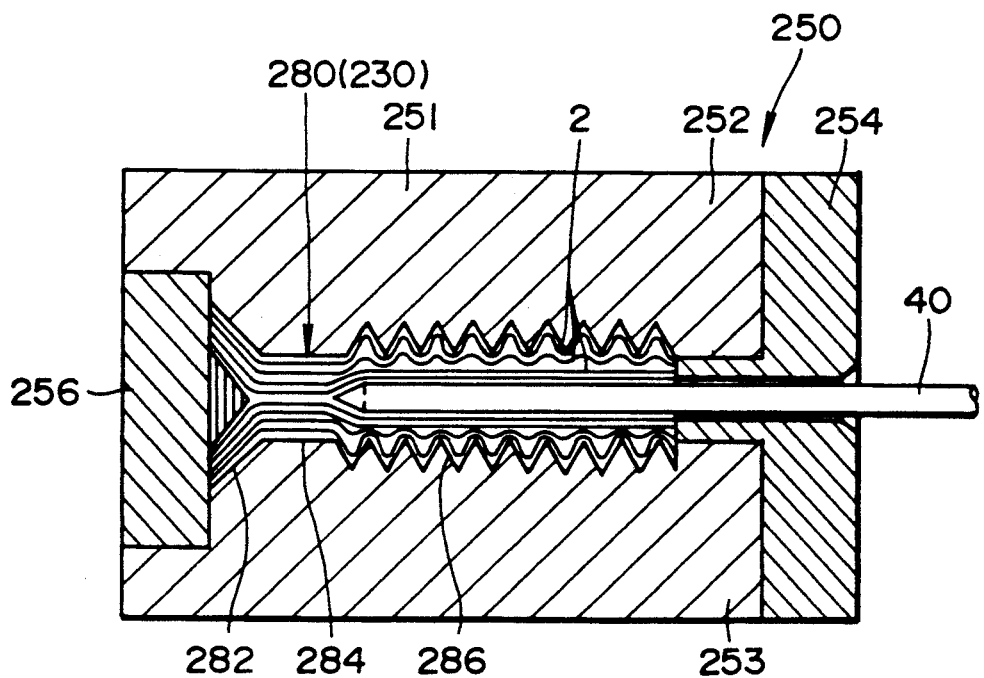
FIG. 30 is a sectional side elevation showing the mold and stick during the secondary molding process.

After positioning of the shoulder round bar 230, it is heated to be soft. A cylindrical pressure stick 40 which is similar to the stick 40 described in the first embodiment is inserted into and through the through hole 274 as shown in FIG. 30. Moreover, the pressure stick 40 is advanced along the axis of the shoulder round bar to a location that is inward of the middle diameter portion 264 of the heated shoulder round bar 230. The stick 40 radially presses and expands the small diameter portion 214 of the shoulder round bar 230. The outer peripheral face of the small diameter portion 214 is brought into contact with the internally threaded portion 262, so that the small diameter portion 214 can have a thread on its peripheral face. Therefore, the shoulder round bar 230 becomes a screw 280 which comprises a head 282, neck 284, and thread portion 286. The stick 40 remains embedded in the screw 280 so as to be a core of the screw 280. The end of the stick 40 is preferably sharpened like a pencil for smooth insertion.

The elongated fibers 2 remains uncut, in the screw 280. The fiber 2 near the peripheral thread of the screw 280 are held in the thread in such a manner that the fibers 2 bent to follow the zigzag (bending in the cross-sectional figure) of the thread of the screw 280. Furthermore, the head core 240 and the shoulder round bar 230 are tightly united.

The screw 280 is cooled to be hard. The half mold members 252 and 253 are separated from each other, for removing the screw. The stick 40 is cut along the end surface of the screw 280. At the end surface of the head, a slit to be engaged with a screwdriver may be inscribed by machining. Therefore, the manufactured screw 280 is completed. The stick 40 is preferably made of a high compressive strength material, such as a steel or FRP similar to the main portion of the screw 280. For providing high pressure to the screw 280, steel is more preferable for the sick 40. In order to make light screws, FRP is more preferable as the stick 40. More preferably, when the stick is inserted into the shoulder round bar 230, the stick is made of steel; and this steel stick can then be replaced by an FRP stick as the core. The dimensions of the stick 40 are selected to be suitable for the dimensions of the screws 280, so as to press to sufficiently expand the shoulder round bar into the internal thread of the lateral mold member 251.

In accordance with the method for producing FRP screws of the embodiment of present invention, the fibers 2 remains uncut, in the screw 280. The fibers 2 near the peripheral thread of the screw 280 are held in the thread in such a manner that the fibers 2 bend to follow the bending cross-sectional pattern of the screw 280. Therefore, sufficiently strong FRP screws whose thread portion also has a similar strength can be produced. Also, because in the outer portion of the head 282, the elongated fibers are arranged in the direction of the conical shape of the head 282, strength against shearing of the head 282 is highly improved.

Furthermore, since the half shoulder round bar 210 is made by pressing in the primary molding process with sufficient pressure, the bar 210 has good mechanical strength. For example, even if the material 6 includes cavities, the primary molding process provides a bar 210 without cavities due to application of sufficient pressure.

Provided the material 6 has enough volume to fill the surfaces 192, 194, and 196 of the mold 180, to form a half shoulder round bar 210, the material 6 dimensions do not need to have high accuracy. Furthermore, it is unnecessary to prepare a material which has a larger cross section portion to be a head and smaller cross section portion to be a thread portion.

If the stick 40 has a mechanical strength which is in excess of that of the FRP, the manufactured screw 280 embedded with the stick 40 along its axis has a higher tensional strength along its axis than that of conventional screws made only of FRP.

Figure 31:
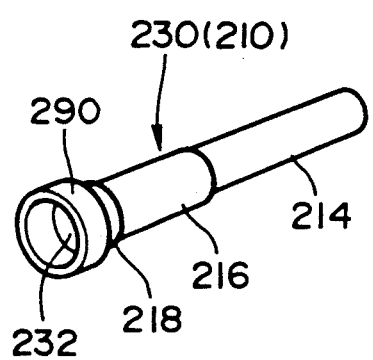
FIG. 31 is a perspective view showing a united shoulder round bar formed by a method of a modification of the fourth embodiment of the present invention.
Figure 32:
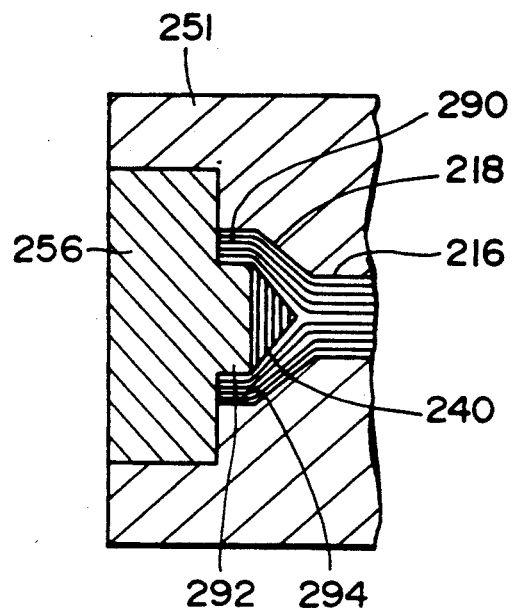
FIG. 32 is a sectional side elevation showing a subject matter of a mold used in the secondary molding of the modification.

A method of modification of the fourth embodiment is described hereinafter with reference to FIGS. 31 and 32. When the half shoulder round bar 210 is manufactured in the primary molding process, a semi-ring-shaped projection projecting concentric from the taper diameter portion 218 is formed simultaneously. Consequently the shoulder round bar 230 united by a pair of the half shoulder round bar 210 includes a ring-shaped projection 290 which is constituted by the semi-ring-shaped projections.

Then, the shoulder round bar 230 with the head core 240 is subjected to the secondary molding process. The mold 250 is generally similar to that shown in FIGS. 29 and 30. However, the end mold member 256 has a projection 292 of a circular cross section to be held in inserted engagement with the outer peripheral face of the ring-shaped projection 290. Also, the lateral mold member 251 includes a hollow 294 communicating directly to the taper diameter portion 266 to be held in engagement with the ring-shaped projection 290. After the secondary molding process, the ring-shaped projection 290 is cut off along the end faces of the taper diameter portion 218 and the head core 240. The ring-shaped projection 290 may be cut off directly after uniting the shoulder round bar 230 and the head core 240.

With the above method of the modification of the fourth embodiment, a disorderment of the arrangement of the fibers 2 which may be generated at an end portion during pressing molding (in this case, the ring-shaped projection) can be rejected. Therefore, the arrangement of the fibers 2 inward of the head 282 is improved.

Figure 33:
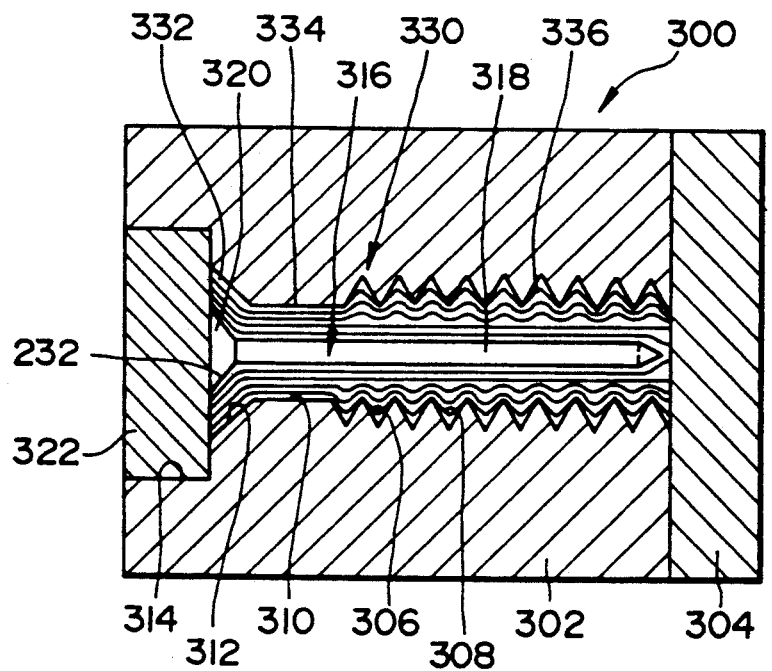
FIG. 33 is a sectional side elevation showing a mold and pressure stick during the secondary molding of another modification of the fourth embodiment.

Another modification of the fourth embodiment is described as follows referring to FIG. 33. This modification improves the secondary molding process. The embedding and uniting of the conical head core 240 into the hollow 232 can be omitted. As shown in FIG. 33, a mold 300 for the secondary molding process comprises a lateral mold member 302 for forming a lateral thread of a screw and an end mold member 304 in a form of a plate attached to one side of the lateral mold member 302 for forming an end face of the screw. The lateral mold member 302 comprises a hole 306 of a circular cross section which includes an internally threaded portion 308, smooth hole portion 310, a taper portion 312, and a large diameter portion 314. The details of the portions 308, 310, 312, and 314 are respectively the same as the internally threaded portion 262, middle diameter portion 264, taper diameter portion 266, and the large diameter portion 270 indicated in FIG. 29.

Returning to FIG. 33, after placing of the shoulder round bar 230 in such a manner that the axis of the bar 230 is aligned with the axis of the hole 306, the shoulder round bar 230 is heated to soften. Then, a stick 316 in a form of a nail which has a bar portion 318 of a circular cross section and a conical head 320 attached concentrically and tapering to the bar portion 318 is advanced by a ram 322 of a circular cross section to be engaged with the large diameter portion 314. The stick 316 is advanced along the axis of the shoulder round bar 230 and inserted therein until the head 320 is held in inserted engagement with the hollow 232 of the shoulder round bar 230. At the outer peripheral face of the shoulder round bar 230, a thread is formed. The stick 316 is kept in embedded condition in the shoulder round bar 230. After cooling, a screw 330 which has a head 332, neck 334, and thread portion 336 and contains a head core 320 (the head of the stick 316) and an axial core 318 (the bar portion of the stick 316) is obtained. In the method, nevertheless to say, the stick 316 is preferably made of FRP as well as the main portion of the screw 330.

In the fourth embodiment, as shown in FIGS. 29 and 30, the stick 40 is of a simple circular cross section. However, in order to improve physical contact between the remained stick 40 and the produced screw 280, the stick 40 preferably is of a shape shown in FIGS. 34 or 35. The stick 40 shown in FIG. 34 has a plurality of projections on the outer peripheral surface thereof. The projections are spaced apart from each other along the axis of the stick 40. The stick 40 shown in FIG. 35 has thread formed on the outer peripheral surface thereof. Accordingly, slipping between the remained stick 40 and the screw 280 are prevented for producing the screw having high tensile strength.

While the matrix 4 of the material 6 is a thermoplastic resin such as polyether-etherketone in the above various preferred embodiments of the present invention, the matrix 4 is not limited to being thermoplastic resins as long as the matrix can be softened during molding processes. Various thermo-setting resins can be utilized as the matrix 4. For Example, various epoxy resins are preferable because of the properties such as mechanical strength thereof. In the preliminary stages before molding a final product, with a material such as a prepreg to be united, this can be heated to a temperature such that epoxy resin is in a semi-polymerized condition known as B-stage. Then, when molding the final product, the material can be heated again to a temperature at which the material becomes completely polymerized and hardened.

While in the various embodiment, the material 6 is in a circular cross section form, it is not limited to this cross section and various other cross sectional shape of the material can be utilized.

What is claimed is:

1. A method of producing a fiber-reinforced plastic screw, the method comprising the steps of:
   (a) preparing a rod material including an elongated matrix formed of a thermoplastic resin material and a plurality of elongated parallel fiber elements embedded within the matrix along the length of the matrix, the fiber elements having melting points substantially higher than the softening point of the matrix material;
   (b) placing the prepared rod material within a cylindrical mold wall in such a manner that the longitudinal axis of the rod material is generally aligned with the axis of the mold wall, the mold wall having an internal thread formed thereon;
   (c) heating the placed rod material to a temperature equal to or greater than the softening point of the matrix material;
   (d) inserting a stick member into the heated rod material along the longitudinal axis of the rod material so as to laterally expand the rod material and to bring the peripheral face of the rod material into contact with the entire mold wall, thereby forming an external thread on the peripheral face of the rod material;
   (e) cooling the thread-formed rod material to a temperature lower than the softening point of the matrix material; and
   (f) removing the cooled rod material from the mold wall.

2. A method according to claim 1, the method further comprising, subsequent to step (f) cutting off said inserted stick member along an end face of the rod material thereby leaving the stick member embedded in the rod material.

3. A method according to claim 2, wherein said stick member is made of a material the strength of which is equal to or greater than that of said rod material.

4. A method according to claim 3, wherein said stick member is made of said plastic material and said fiber elements.

5. A method according to claim 3, comprising removing said inserted stick member said rod material and inserting another stick member made of lighter material than said first-mentioned stick member into an aperture in the rod material formed by said stick member during said inserting step.

6. A method according to claim 3, wherein said stick member has a plurality of projections spaced apart from each other along the axis thereof.

7. A method according to claim 5, wherein said stick member has a plurality of projections spaced apart from each other along the axis thereof.

8. A method according to claim 3, wherein said elongated fiber elements are carbon fibers.

9. A method according to claim 1, wherein said stick member comprises a rod portion which is inserted into said rod material during said inserting step and a flange portion extending generally coaxially from the rod portion, the flange portion being of a larger cross section than the rod portion to form a head portion of a screw.

10. A method according to claim 1, wherein the step of preparing said rod material comprises: molding a pair of generally semi-cylindrical materials formed of the matrix and the fiber elements; and joining the pair of semi-cylindrical materials to each other to form a generally fully cylindrical material for use as said rod material.

11. A method according to claim 10, wherein each of said semi-cylindrical material has a first end portion and a second portion the first end portion being of a radius larger than the radius of the second portion, the rod material resulting from the joining step having a head portion of a larger cross section at one of its ends, and wherein said step comprising placing the prepared rod material within the cylindrical mold wall includes positioning the head portion of the rod material out of the cylindrical mold wall.

12. A method according to claim 11, wherein said molding of said generally semi-cylindrical materials during said step of preparing said rod material further comprises forming a recess of a semi-circular cross section at said first end portion in such a manner that the recess and said semi-cylindrical material are concentric to each other, whereby said rod material resulting from said joining step has a hollow section of a circular cross section at said head portion.

13. A method according to claim 12, in which said recess is of a semi-conical shape, whereby said hollow section in the head portion of said rod material is of a conical shape.

14. A method according to claim 12, the method further comprising, after the step of removing the cooled rod material from said mold wall, cutting off said inserted stick member along an end face of the rod material thereby leaving the stick member embedded in the rod material.

15. A method according to claim 14, wherein said stick member is made of a material having a strength which is equal to or greater than that of said rod material.

16. A method according to claim 15, wherein said stick member is made of said plastic material and said fiber elements.

17. A method according to claim 15, comprising removing said inserted stick member from said rod material and inserting another stick member made of lighter material than said first-mentioned stick member into an aperture in the rod material formed by said stick member during said inserting step.

18. A method according to claim 15, wherein said stick member has a plurality of projections spaced apart from each other along the axis thereof.

19. A method according to claim 17, wherein said stick member has a plurality of projections spaced apart from each other along the axis thereof.

20. A method according to claim 15, wherein said elongated fiber elements are carbon fibers.

21. A method of producing a fiber-reinforced plastic screw having a thread portion and a head portion wherein the cross section of the head portion is larger than that of the thread portion, the method comprising the steps of:

a first molding process sequence including:

(a) preparing a rod material including an elongated matrix comprising a thermoplastic resin material and a plurality of elongated parallel fiber elements embedded within the matrix material along the length of the matrix, the fiber elements having melting points substantially higher than the softening point of the matrix material;

(b) placing the prepared rod material into a mold chamber, the mold chamber including an internal surface of a semi-circular cross section, the internal surface having a small diameter portion and a large cross section portion communicating concentrically to the small diameter portion, the rod material being placed in the mold chamber in such a manner that the longitudinal axis of the rod material is generally aligned with the axis of the internal surface of the mold chamber;

(c) heating the placed rod material to a temperature equal to or greater than the softening point of the matrix material;

(d) pressing the heated material perpendicularly to the axis thereof by a ram which has a plane surface facing said internal surface of said mold chamber, thereby forming a half round bar from the material, the half round bar being generally in a form of half a round bar cut at a plane including a center axis thereof, the half round bar having a first end portion and a second portion, the first end portion being of a radius larger than the radius of the second portion;

(e) cooling the half round bar to a temperature lower than the softening point of the matrix material; and (f) taking the cooled half round bar out of said mold chamber; and a second molding process sequence including:

(g) joining the half round bar to another half round bar which is processed similarly to said half round bar to form a generally fully cylindrical material, the fully cylindrical material having a head portion of a larger cross section consisting of said first end portion;

(h) placing the fully cylindrical material within a cylindrical mold wall in such a manner that the longitudinal axis of the fully cylindrical material is generally aligned with the axis of the mold wall, the mold wall including a large cross section portion for receiving said head portion and small diameter portion having an internal thread formed thereon to receive the second portion;

(i) heating the placed fully cylindrical material to a temperature equal to or greater than the softening point of the matrix material;

(j) inserting a stick member into the heated fully cylindrical material along the longitudinal axis of the fully cylindrical material so as to laterally expand the fully cylindrical material and to bring the peripheral face of the fully cylindrical material into contact with the entire mold wall, thereby forming an external thread on the peripheral face of the fully cylindrical material;

(k) cooling the thread-formed fully cylindrical material to a temperature lower than the softening point of the matrix material; and (l) taking the cooled fully cylindrical material out of the mold wall.

22. A method according to claim 21, wherein said ram for said pressing step of said first molding process sequence further comprises a projection of a semi-circular cross section at said plane surface thereof, the projection being disposed inward of said large cross section portion is such a manner that the projection is concentric to the axis of the mold chamber during said pressing step, whereby said half round bar has a recess of a semi-circular cross section at said end portion thereof in such a manner that the recess and said half round bar are concentric to each other, whereby said fully cylindrical material resulting from said step of joining the half round bar to another half round bar in said second molding process sequence has a hollow section of circular cross section formed in said head portion of the cylindrical material, and the method further comprising after said step of joining the half round bars, putting a head core into said hollow section the head core being of a circular cross section.

23. A method according to claim 22, in which said projection is of a semi-conical shape, whereby said hollow is of a conical shape, and in which said head core is of a conical shape.

24. A method according to claim 22, the method further comprising after said taking out the cooled fully cylindrical material from said mold wall, cutting off said inserted stick member along an end face of the rod material thereby leaving the stick member embedded in the rod material.

25. A method according to claim 24, wherein said stick member is made of a material having a strength which is equal to or greater than that of said rod material.

26. A method according to claim 25, wherein said stick member is made of said plastic material and said fiber elements.

27. A method according to claim 25, wherein said inserting step of said second molding process sequence comprises removing said inserted stick member from said rod material and inserting another stick member made of lighter material than said stick member into an aperture in the rod material which is formed by said first-mentioned stick member.

28. A method according to claim 25, wherein said stick member has a plurality of projections space apart from each other along the axis thereof.

29. A method according to claim 27, wherein said stick member has a plurality of projections spaced apart from each other along the axis thereof.

30. A method according to claim 25, wherein said elongated fiber elements are carbon fibers.

31. A method of producing a fiber-reinforced plastic rivet, the rivet to be produced having a shank portion and a head portion, wherein the cross section of the head portion is larger than that of the shank portion, the method comprising the steps of:

(a) a preparing a rod material including an elongated matrix formed of a plastic material and a plurality of elongated parallel fiber elements embedded within the matrix along the length of the matrix material, the fiber elements having melting points substantially higher than the softening point of the matrix;

(b) placing the prepared rod material of the rivet into a mold chamber, the mold chamber including an internal surface of a semi-circular cross section, the internal surface having a small diameter portion and a large cross section portion communicating concentrically to the small diameter portion, the material being placed in the mold chamber in such a manner that the longitudinal axis of the rod material is generally aligned with the axis of the internal surface of the mold chamber;

(c) heating the placed rod material to a temperature equal to or greater than the softening point of the matrix material;

(d) pressing the heated rod material perpendicularly to the axis thereof by a ram which has a plane surface facing said internal surface of said mold chamber, thereby forming a half round bar from the material, the half round bar being generally in the form of half a round bar cut at a plane including a center axis thereof, the half bar having a first end portion and a second portion, the first end portion being of a radius larger than the radius of the second portion;

(e) cooling the half round bar to a temperature lower than the softening point of the matrix;

(f) taking the cooled rod material out of the mold chamber; and (g) joining the half round bar to another half round bar formed in the same manner as said first-mentioned half round bar to form a generally fully cylindrical material, the fully cylindrical material having a head portion of a larger cross section consisting of said first end portion.

32. A method according to claim 31, wherein said ram for said pressing step further comprises a projection of a semi-circular cross section at said plane surface thereof, the projection disposed inward of said large cross section portion in such a manner that the projection is concentric to the axis of the mold chamber during said step of pressing the heated rod material, whereby said half round bar has a recess of a semi-circular cross section formed therein at said first end portion in such a manner that the recess and said half round bar are concentric to each other, whereby said fully cylindrical material resulting from said step of joining the half round bars has a hollow section of a circular cross section formed in said head portion, and after said step of joining the half round bars, uniting a head core and said hollow section in such a manner that the head core is placed into said hollow section with the head core being of a circular cross section.

33. A method according to claim 32, in which said projection is of a semi-conical shape, whereby said hollow section is of a conical shape, and in which said head core is of a conical shape.

34. A method according to claim 32, wherein said elongated fiber elements are carbon fibers.

35. A method of producing a fiber-reinforced plastic screw, the method comprising the steps of:
(a) preparing a rod material including an elongated matrix formed of a plastic material and a plurality of elongated parallel fiber elements embedded within the matrix material along the length of the matrix, the fiber elements having melting points substantially higher than the softening point of the matrix material;
(b) placing the prepared rod material within a cylindrical mold wall in such a manner that the longitudinal axis of the rod material is generally aligned with the axis of the mold wall, the mold wall defining a generally cylindrical first mold chamber and having an internal thread formed thereon, said cylindrical mold wall being formed in a mold, the mold having a inner peripheral wall and an end wall which define a second mold chamber in direct communication with the first mold chamber, for molding a head portion of the screw, the peripheral wall continuously extending from one of the opposite ends of the mold wall, the end wall defining an end of the second mold chamber and tapering off toward the first mold chamber, the apex of the end wall being located on the axis of the first mold chamber and wherein the pressing step comprises pressing the rod material toward the second mold chamber so that the softened rod material laterally expands and is injected, under the guidance of the tapered end wall, into the second mold chamber, whereby the thread-formed rod material has a head portion formed by the second mold chamber, the head portion having a hollow section formed therein by the end wall;
(c) heating the placed rod material to a temperature equal to or greater than the softening point of the matrix material;
(d) axially pressing the heated rod material so as to laterally expand the rod material and to bring the peripheral face of the rod material into contact with the entire mold wall, whereby an external thread is formed on the peripheral face of the rod material;
(e) cooling the thread-formed rod material to a temperature lower than the softening point of the matrix material; and
(f) taking the cooled rod material out of the mold wall.

36. A method according to claim 35, the method further comprising after said step of taking said cooled rod material out of the mold wall; uniting a head core and said hollow section in such a manner that the head core is put into said hollow section, with the head core being of a circular cross section.

37. A method according to claim 36, in which said end wall is of a conical shape, whereby said hollow section is of a conical shape, and in which said head core is of a conical shape.

38. A method according to claim 37, wherein said elongated fiber elements are carbon fibers.

39. A method of producing a fiber-reinforced plastic screw, the method comprising the steps of:
(a) preparing a rod material including an elongated matrix formed of a plastic material and a plurality of elongated parallel fiber elements embedded within the matrix material along the length of the matrix, the fiber elements having melting points substantially higher than the softening point of the matrix material;
(b) placing the prepared rod material into a mold chamber, the mold chamber including an internal surface of a generally semi-circular cross section, the internal surface having an internal thread formed thereon, the rod material being placed in the mold chamber in such a manner that the longitudinal axis of the rod material is generally aligned with the axis of the internal surface of the mold chamber;
(c) heating the placed rod material to a temperature equal to or greater than the softening point of the matrix material;
(d) pressing the heated material perpendicularly to the axis thereof by a ram which has a plane surface said internal surface of said mold chamber, thereby forming a half round bar from the material, the half round bar being generally in the form of half a round bar cut at a plane including a center axis thereof, the half bar having an eternal thread on the peripheral face thereof;
(e) cooling the thread-formed half round bar to a temperature lower than the softening point of the matrix material;
(f) taking the cooled half round bar out of the mold chamber; and
(g) joining the half round bar to another half round bar which is formed in the same manner as said first-mentioned half round bar to form a generally fully cylindrical material, and with the fully cylindrical material having an external thread thereon.

* * * * *

UNITED STATES PATENT AND TRADEMARK OFFICE
CERTIFICATE OF CORRECTION

PATENT NO. : 5,209,888

DATED : May 11, 1993

INVENTOR(S) : Shusaka Shimada, et al.

It is certified that error appears in the above-identified patent and that said Letters Patent is hereby corrected as shown below:

Column 1, line 15: "frequency" should read --frequently--

Column 4, line 33; "elongated parallel fiber elements material" should read --elongated matrix formed of a plastic material--

Column 8, line 65: after "to" insert --the--

Column 9, line 40: after "into" insert --the--

Column 10, line 12: "heat" should read --head--

Column 11, line 8: after "advanced" insert --and--

Column 11, line 13: after "The" insert --half--

Column 11, line 37: "adhere" should read --adhered--

Column 11, line 45: "ar" should read --are--

Column 11, line 56: "references" should read --reference--

Column 13, line 4: "an" should read --and--

UNITED STATES PATENT AND TRADEMARK OFFICE
CERTIFICATE OF CORRECTION

PATENT NO. : 5,209,888

DATED : May 11, 1993

INVENTOR(S) : Shusaka Shimada, et al.

It is certified that error appears in the above-identified patent and that said Letters Patent is hereby corrected as shown below:

Column 13, line 26:  after "The" insert --lateral--

Column 13, line 41:  "threaded" should read --thread--

Column 13, line 45:  "larger" should read --large--

Column 14, line 12:  "fiber" should read --fibers--

Column 17, line 10, Claim 5:  after "member" insert --from--

Column 19, line 67, Claim 28:  "space" should read --spaced--

Column 21, line 24, Claim 35:  "a" should read --an--

UNITED STATES PATENT AND TRADEMARK OFFICE
CERTIFICATE OF CORRECTION

PATENT NO. : 5,209,888
DATED : May 11, 1993
INVENTOR(S) : Shusaka Shimad, et al.

It is certified that error appears in the above-indentified patent and that said Letters Patent is hereby corrected as shown below:

Column 22, line 38, Claim 37: after "surface" insert --facing--.

Signed and Sealed this

Twenty-fifth Day of January, 1994

*Attest:*

BRUCE LEHMAN

*Attesting Officer*     *Commissioner of Patents and Trademarks*